May 15, 1945.  H. T. HALLOWELL, JR  2,376,137
INDEXING MEANS FOR ROTARY WORK TABLES
Filed Jan. 23, 1943  2 Sheets-Sheet 1
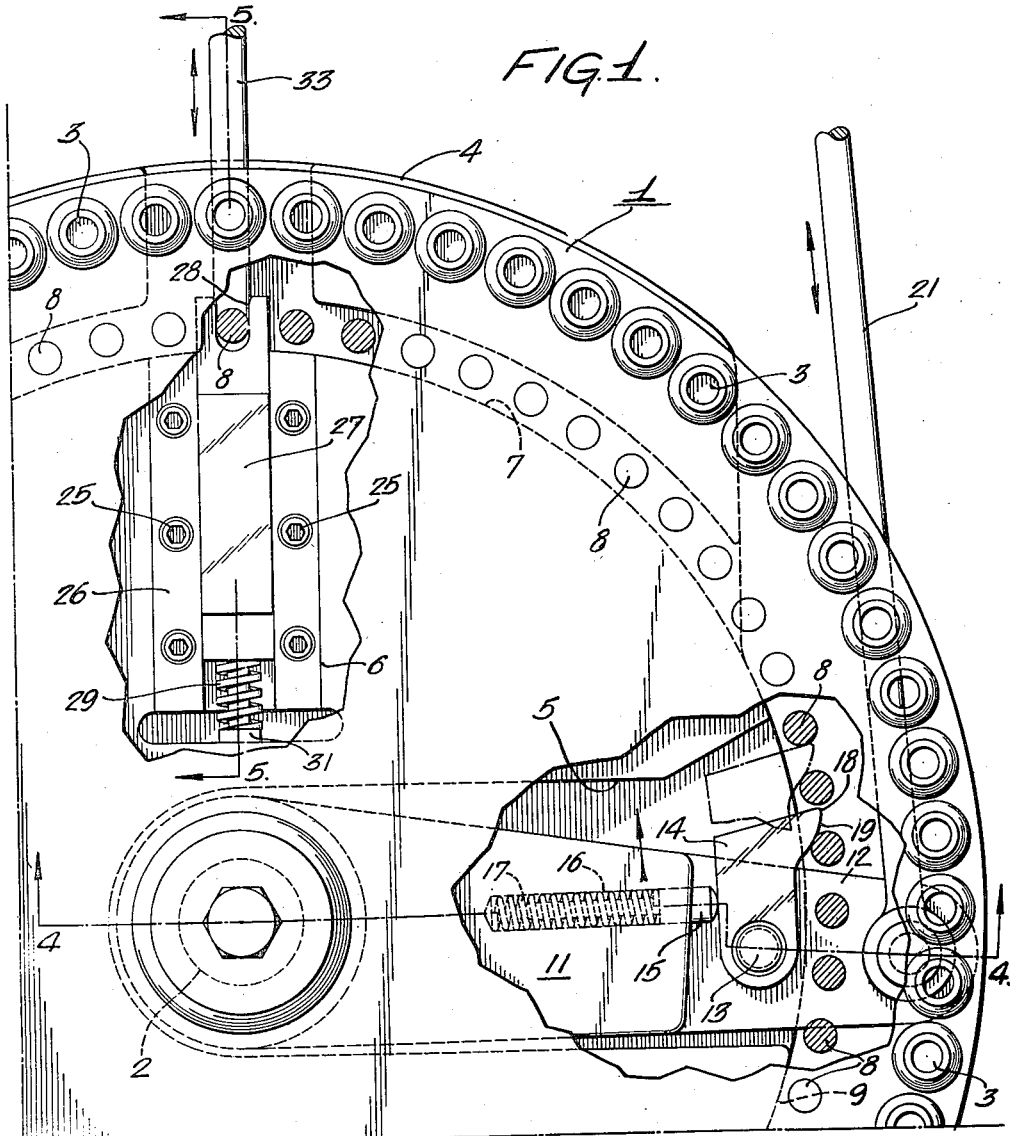
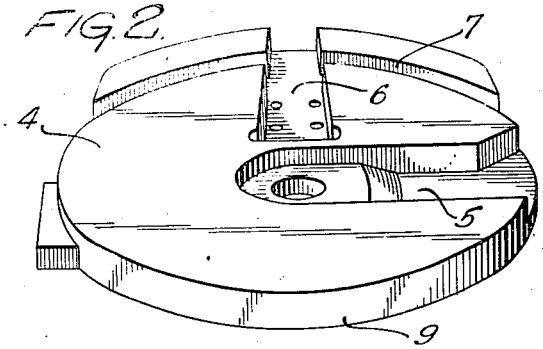
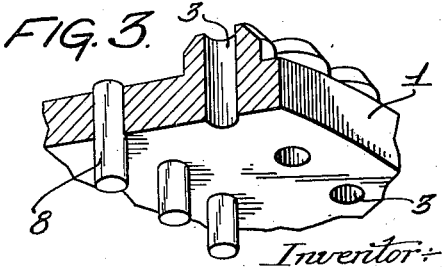

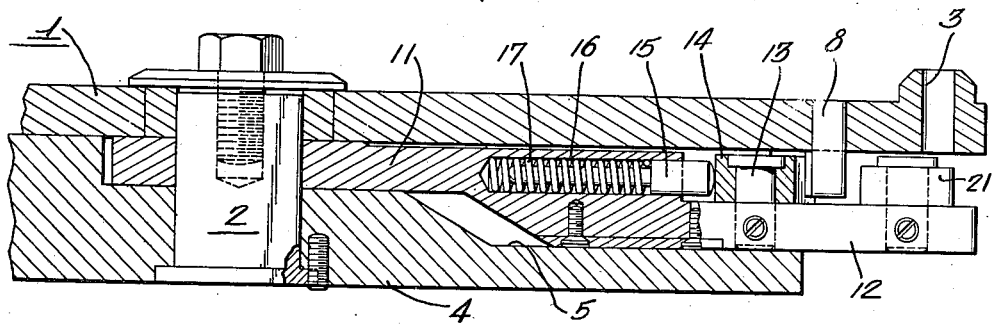
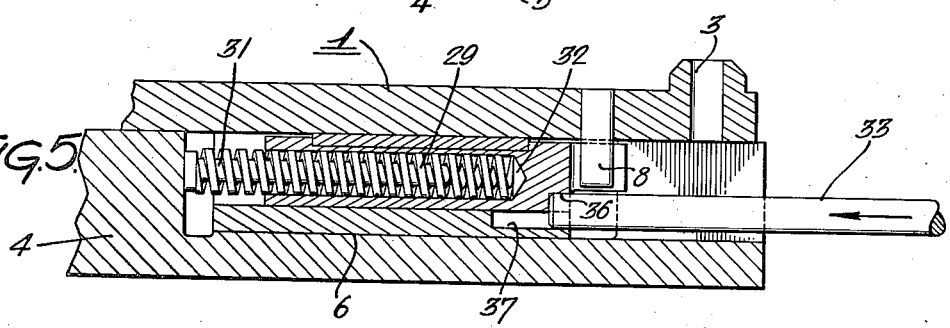
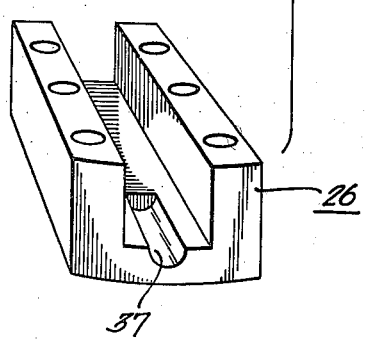
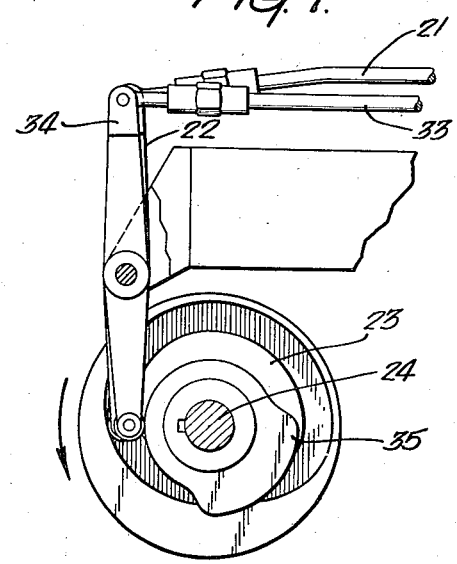

Patented May 15, 1945

2,376,137

UNITED STATES PATENT OFFICE 2,376,137

INDEXING MEANS FOR ROTARY WORKTABLES

Howard Thomas Hallowell, Jr., Jenkintown, Pa., assignor to Pennsylvania Manufacturing Company, Jenkintown, Pa., a corporation of Delaware Application January 23, 1943, Serial No. 473,384

2 Claims. (Cl. 74—142)

This invention relates to indexing means for rotary worktables of the type, for example, disclosed in my pending U. S. application Serial Number 424,052, and a principal object of the invention is to provide a device for traversing and indexing the table which shall have the advantages of relative simplicity and inexpensiveness of form and manufacture combined with a high degree of functional precision.

The invention resides also in certain structural details hereinafter described and illustrated in the attached drawings, in which:

Figure 1 is a fragmentary plan view of a worktable equipped with traversing and indexing means in accordance with my invention;

Fig. 2 is a reduced view in perspective of the bed-plate which underlies the table and which constitutes a support for the operating parts of the traversing and indexing means;

Fig. 3 is a fragmentary view in perspective of the under side of the work-table;

Fig. 4 is a sectional view on the line 4—4, Fig. 1;

Fig. 5 is a sectional view on the line 5—5, Fig. 1;

Fig. 6 is an exploded view in perspective showing detached elements of the part of the machine illustrated in Fig. 5; and Fig. 7 is a diagrammatic view illustrating the cam-actuating means for the feeding and indexing device.

With reference to Figure 1, the table 1 is suitably supported for rotation in a horizontal plane about a vertical pintle 2, see also Fig. 4. The table has in its peripheral portion a circumferential series of sockets 3 for reception of the workpieces, and in the present instance the table is traversed and indexed so as to bring the workpieces successively into a predetermined position or positions for performance of certain assembling operations.

Secured to the relatively fixed pintle 2 and underlying the table 1 is a bed-plate 4, see Fig. 2, said plate having in its upper surface radially extending recesses 5 and 6, the functions of which will be hereinafter described, and having also an arcuate slot 7 concentric with the axis of the pintle 2 and intersecting the radial recess 6 as illustrated. The table 1 has a series of depending pins 8 arranged in annular series concentric with the pintle 2 and arranged so that each of the said pins is in radial alignment with one of the work-receiving sockets 3 previously described. The pins 8 extend downwardly below the upper surface of the bed-plate 4, and the slot 7 constitutes a passage for the pins as the work-table is rotated, it being noted that the inner wall of the slot 7 is, in effect, a continuation of the circular free edge 9 of the bed-plate. The apertures or sockets which receive the pins 8 are accurately and uniformly spaced with respect to each other and with respect to their radial alignments with the sockets 3, and the axes of the sockets normal to the flat plane of the work-table. The pins 8, which are tightly fitted to the sockets, are preferably of hardened steel or the like so as to reduce wear to a minimum, as hereinafter described.

Rotatably attached to the pintle 2 and seating upon the bed-plate within the recess 5 is a lever 11, the outer end portion 12 of the lever being offset downwardly from the inner portion, as illustrated in Fig. 4, and the recess 5 of the bed-plate being formed to accommodate this offset portion as shown. Pivotally attached by means of a pin 13 to the said offset outer end of the lever is a pawl 14 which is of a shape to engage the depending pins 8 of the table, as shown in Fig. 1. A pin 15 is mounted in a cylindrical recess 16 in the lever 11 and is urged outwardly by a spring 17 against the inner side of the pawl 14 so as to resiliently hold the pawl in a relatively extended position on its pivot 13 for engagement with the pins 8. When the lever 12 is advanced in the direction of the arrow in Fig. 1, the tip 18 of the pawl engages one of the pins 8 to advance the table to an extent corresponding to the throw of the lever, and on the return stroke of the lever, the curved outer portion 19 of the pawl acts as a cam against the adjoining pin 8 to displace the pawl against the action of the spring-pressed pin 15 and to permit return of the lever to the original retracted position without affecting the position of the work-table. The lever is oscillated, as hereinafter described, and in each oscillation the table is advanced to a predetermined extent by action of the pawl on the pins 8, as described. Oscillation of the lever is effected through a rod 21 which connects the outer end of the lever with a second lever 22, and through this lever with a cam 23 on a cam shaft 24.

Secured by screws 25 in the recess 6 of the bed-plate is a guide member 26, see Fig. 6, and slidably but accurately fitted in this guide is a detent member 27. The outer end of this member is provided with a recess 28 which in an advanced position of the member is adapted to engage one of the pins 8, as shown in Figs. 1 and 5, to thereby hold the table stationary in a predetermined position of angular adjustment on the pintle 2. The detent is urged toward the advanced position by a spring 29 which is mounted on a pin 31 projecting from the inner wall of the recess 6 and into a longitudinal recess 32 in the detent. The detent may be retracted against the pressure of the spring 29 to release the pin 8 with which it may be engaged, and this retractive movement of the detent is effected by means of a plunger rod 33 which is connected to a pivoted lever 34, and through this lever with a cam 35 on the shaft 24. The end of the rod 33 fits into a semi-cylindrical recess 36 in the outer end of the detent 27, which recess registers with a corresponding elongated recess 37 in the bottom of the guide 26. The recess 37 affords a longitudinal movement of the rod 33 sufficient to fully retract the detent 27 from the pins 8. By this means, the cam 35 acts to periodically retract the detent 27 and to permit the spring 29 to again advance the detent into an operative position with respect to the pins 8. The cams 23 and 35 are formed and are relatively arranged on the shaft 24 so as to synchronize the movements of the pawl 14 and the detent 27 whereby the movements of the pawl to advance or to traverse the table as described occur only after the detent 27 has been retracted, the detent again advancing into the operative position for engagement with the aligned pin 8 when the traverse movement of the table due to the pawl action is completed. It will be apparent that by reason of the close fit of the detent 27 in the guide 26 and the close engagement of the pins 8 in the inner end of the recess 28, the table will be accurately held in properly indexed positions. It is to be noted that the outer end of the recess 28 is slightly tapered to afford a degree of tolerance for the traversing action of the pawl 14.

I claim:

1. In combination, a rotary work-table having a concentric series of cylindrical sockets, the longitudinal axes of said sockets being parallel to each other and to the rotary axis of the work-table, a cylindrical pin rigidly held in each of the sockets and projecting from one face of the table at right angles to the latter, a radially movable detent for immobilizing the table, a guide rigidly supporting the detent for movement in the radial path, said detent having a recess for reception of said pins individually, the recess being closely fitted to the pin and having a flared mouth whereby to index the table to predetermined positions and to maintain the table rigidly in said positions, a pawl for traversing the table approximately into said positions, and means for synchronously actuating said pawl and detent.

2. In combination, a rotary work-table, a stationary base plate forming a support for said table, said plate having in the upper surface thereof a pair of relatively diverging slots intersecting the outer edge of the plate, an arm arranged to oscillate transversely in one of said slots, a pawl element carried by said arm, a detent member closely fitted to the other of said slots and slidable longitudinally therein, a series of elements projecting downwardly from the under side of said table for co-action with both the pawl and the detent, and means for synchronously actuating said arm and said detent so as to intermittently traverse the table through the medium of said pawl and to retain the table between said intermittent movements in accurately indexed position through the medium of said detent.

HOWARD THOMAS HALLOWELL, Jr.